US012741643B1

(12) United States Patent
Mirbeygi Moghaddam et al.

(10) Patent No.: US 12,741,643 B1
(45) Date of Patent: Sep. 22, 2026

(54) VEHICLE SYSTEMS AND METHODS FOR AUTOMATED MITIGATION OF ROUGH ROAD CONDITIONS

(71) Applicant: GM GLOBAL TECHNOLOGY OPERATIONS LLC, Detroit, MI (US)

(72) Inventors: Amirreza Mirbeygi Moghaddam, North York (CA); Mohammadali Shahriari, Markham (CA); Kevin A. O'Dea, Ann Arbor, MI (US); Hassan Askari, Thornhill (CA); Edward Scott Pancost, Jr., Walled Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/174,134

(22) Filed: Apr. 9, 2025

(51) Int. Cl.
*B60W 30/18* (2012.01)
*B60W 10/04* (2006.01)
(Continued)

(52) U.S. Cl.
CPC ............ *B60W 30/18* (2013.01); *B60W 10/04* (2013.01); *B60W 10/18* (2013.01); *B60W 10/20* (2013.01);
(Continued)

(58) Field of Classification Search
CPC ...... B60W 30/18; B60W 10/04; B60W 10/18; B60W 10/20; B60W 40/12;
(Continued)

(56) References Cited

U.S. PATENT DOCUMENTS

2009/0187311 A1* 7/2009 Christiansen ........ B62D 5/0469 701/41
2015/0235557 A1* 8/2015 Engelman ........ G08G 1/096741 701/24

(Continued)

FOREIGN PATENT DOCUMENTS

CN 101275900 A 10/2008
DE 102009020826 B4 2/2016

OTHER PUBLICATIONS

Lepine, Julien; Rouillard, Vincent; Sek, Michael: wavelet transform to index road vehicle vibration mixed mode signals. In: proceedings of the Internoise 2015/ASME NCAD Meeting, NCAD2015-5909, Aug. 9-12, 2015, San Francisco, CA, USA. New York: The American Society of Mechanical Engineers, 2015. Titelblatt + Impressum S. V001T01A003-1-5. ISBN 978-0-7918-5681-9.

(Continued)

*Primary Examiner* — Jacob M Amick

(57) ABSTRACT

An example vehicle system for automated mitigation of rough road conditions includes front wheels, a steering linkage, a torque sensor, and a vehicle control module configured to obtain a torque signal from the torque sensor, calculate a first average length value for the torque signal according to a first sampling frequency, calculate a first average variance value for the torque signal, calculate a second average length value for the torque signal according to a second sampling frequency, calculate a second average variance value for the torque signal, determine whether a rough road condition threshold is satisfied according to the first average length value, the first average variance value, the second average length value and the second average variance value, and automatically adjust at least one of (Continued)

vehicle acceleration, vehicle braking or vehicle steering, in response to the rough road condition threshold being satisfied.

20 Claims, 6 Drawing Sheets

(51) Int. Cl.

| | |
|---|---|
| ***B60W 10/18*** | (2012.01) |
| ***B60W 10/20*** | (2006.01) |
| ***B60W 40/12*** | (2012.01) |
| ***G01L 3/10*** | (2006.01) |
| *B62D 3/12* | (2006.01) |
| *B62D 7/18* | (2006.01) |
| *B62D 7/20* | (2006.01) |

(52) U.S. Cl.
CPC ............ *B60W 40/12* (2013.01); *G01L 3/102* (2013.01); *B60W 2510/202* (2013.01); *B60W 2552/35* (2020.02); *B60W 2710/18* (2013.01); *B60W 2710/20* (2013.01); *B60W 2720/106* (2013.01); *B62D 3/12* (2013.01); *B62D 7/18* (2013.01); *B62D 7/20* (2013.01)

(58) Field of Classification Search
CPC ....... B60W 2552/35; B60W 2510/202; B60W 2710/18; B60W 2710/20; B60W 2720/106; G01L 3/102; B62D 3/12; B62D 7/18; B62D 7/20
See application file for complete search history.

(56) References Cited

U.S. PATENT DOCUMENTS

2019/0308629 A1* 10/2019 Aiuto ...................... B60T 8/172
2019/0359219 A1* 11/2019 Isshiki .................. B60W 40/06
2022/0410927 A1* 12/2022 Lee ................... B60W 60/0051

OTHER PUBLICATIONS

German Office Action from counterpart DE1020251193568, dated Jan. 13, 2026.

* cited by examiner

VEHICLE SYSTEMS AND METHODS FOR AUTOMATED MITIGATION OF ROUGH ROAD CONDITIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems and methods for automated mitigation of rough road conditions.

Vehicles sometimes travel over rough paved roads or gravel roads, which can affect driving performance of the vehicles. Separately, vehicles may include a torque sensor coupled with a steering linkage of the vehicle to detect torque applied to the steering linkage.

SUMMARY

An example vehicle system for automated mitigation of rough road conditions includes front wheels of a vehicle, a steering linkage coupled with the front wheels and configured to control a steering orientation of the front wheels, a torque sensor coupled with the steering linkage and configured to generate a torque signal associated with the steering linkage, and a vehicle control module configured to obtain the torque signal from the torque sensor, calculate a first average length value for the torque signal according to a first sampling frequency, calculate a first average variance value for the torque signal according to the first sampling frequency, calculate a second average length value for the torque signal according to a second sampling frequency, wherein the second sampling frequency is less than the first sampling frequency, calculate a second average variance value for the torque signal according to the second sampling frequency, determine whether a rough road condition threshold is satisfied according to the first average length value, the first average variance value, the second average length value and the second average variance value, and automatically adjust at least one of vehicle acceleration, vehicle braking or vehicle steering, in response to the rough road condition threshold being satisfied.

In some examples, the steering linkage includes a steering wheel, a steering column coupled with the steering wheel, a rack and pinion coupled with the steering column, two steering arms coupled with the rack and pinion, and two steering knuckles each coupled between one of the two steering arms and one of the front wheels, wherein the steering wheel is configured to change the steering orientation of the front wheels in response to a receiving a rotation input from a driver, via mechanical movement or rotation of the steering column, the rack and pinion, the two steering arms and the two steering knuckles.

In some examples, the steering linkage includes a torsion bar and a steering wheel, and the torque sensor is positioned at a top of the torsion bar, underneath the steering wheel.

In some examples, the torque sensor is configured to measure net torque applied to the torsion bar, which includes rotation input applied to the steering wheel by a driver, and feedback noise due to mechanical interaction of the front wheels with a road the vehicle is traveling on.

In some examples, the torque sensor includes a magnet and magnetoresistive elements which change resistance in response to the magnet being rotated relative to the magnetoresistive elements due to rotation of the torsion bar.

In some examples, the vehicle control module is configured to calculate a third average length value for the torque signal according to a third sampling frequency, wherein the third sampling frequency is less than the first sampling frequency and the second sampling frequency, calculate a third average variance value for the torque signal according to the third sampling frequency, and determine whether the rough road condition threshold is satisfied according to the first average length value, the first average variance value, the second average length value, the second average variance value, the third average length value and the third average variance value.

In some examples, the second sampling frequency is half of the first sampling frequency, and the third sampling frequency is half of the second sampling frequency.

In some examples, calculating the first average length value includes calculating a length fractal dimension value for each sample of the torque signal according to the first sampling frequency, and determining an average of calculated length fractal dimension values for each sample.

In some examples, calculating the first average variance value includes calculating a variance fractal dimension value for each sample of the torque signal according to the first sampling frequency, and determining an average of calculated variance fractal dimension values for each sample.

In some examples, the vehicle control module is configured to generating a length plot each average length value with respect to each corresponding sampling frequency on a log scale, determine a length slope value according to the length plot of each average length value, generating a variance plot each average variance value with respect to each corresponding sampling frequency on the log scale, determine a variance slope value according to the variance plot of each average variance value, and determine whether the rough road condition threshold is satisfied by comparing the length slope value and the variance slope value to slope value thresholds.

In some examples, a length slope value threshold is at least 1.7, and a variance slope value threshold is at least 1.4.

An example method for automated mitigation of rough road conditions includes obtaining a torque signal from a torque sensor coupled with a steering linkage of a vehicle, wherein the vehicle includes front wheels, the steering linkage is coupled with the front wheels of the vehicle, and the steering linkage is configured to control a steering orientation of the front wheels, calculating a first average length value for the torque signal according to length fractal dimensions of the torque signal at a first sampling frequency, calculating a second average length value for the torque signal according to length fractal dimensions of the torque signal at a second sampling frequency, wherein the second sampling frequency is less than the first sampling frequency, determining whether a rough road condition threshold is satisfied according to the first average length value, and the second average length value, and automatically adjusting at least one of vehicle acceleration, vehicle braking or vehicle steering, in response to the rough road condition threshold being satisfied.

In some examples, the method includes calculating a third average length value for the torque signal according to length fractal dimensions of the torque signal at a third sampling frequency, wherein the third sampling frequency is less than the first sampling frequency and the second sampling frequency, and determining whether the rough road condition threshold is satisfied according to the first average length value, the second average length value, and the third average length value.

In some examples, the second sampling frequency is half of the first sampling frequency, and the third sampling frequency is half of the second sampling frequency.

In some examples, the method includes plotting each average length value with respect to each corresponding sampling frequency on a log scale, determining a length slope value according to the plot of each average length value, and determining whether the rough road condition threshold is satisfied by comparing the length slope value to a slope value threshold.

In some examples, the steering linkage includes a torsion bar and a steering wheel, and the torque sensor is configured to measure net torque applied to the torsion bar, which includes rotation input applied to the steering wheel by a driver, and feedback noise due to mechanical interaction of the front wheels with a road the vehicle is traveling on.

An example method for automated mitigation of rough road conditions includes obtaining a torque signal from a torque sensor coupled with a steering linkage of a vehicle, w wherein the vehicle includes front wheels, the steering linkage is coupled with the front wheels of the vehicle, and the steering linkage is configured to control a steering orientation of the front wheels, calculating a first average variance value for the torque signal according to variance fractal dimensions of the torque signal at a first sampling frequency, calculating a second average variance value for the torque signal according to variance fractal dimensions of the torque signal at a second sampling frequency, wherein the second sampling frequency is less than the first sampling frequency, determining whether a rough road condition threshold is satisfied according to the first average variance value, and the second average variance value, and automatically adjusting at least one of vehicle acceleration, vehicle braking or vehicle steering, in response to the rough road condition threshold being satisfied.

In some examples, the method includes calculating a third average variance value for the torque signal according to variance fractal dimensions of the torque signal at a third sampling frequency, wherein the third sampling frequency is less than the first sampling frequency and the second sampling frequency, and determining whether the rough road condition threshold is satisfied according to the first average variance value, the second average variance value, and the third average variance value.

In some examples, the second sampling frequency is half of the first sampling frequency, and the third sampling frequency is half of the second sampling frequency.

In some examples, the method includes plotting each average variance value with respect to each corresponding sampling frequency on a log scale, determining a variance slope value according to the plot of each average variance value, and determining whether the rough road condition threshold is satisfied by comparing the variance slope value to a slope value threshold.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles sometimes travel over rough paved roads or gravel roads, which can affect driving performance of the vehicle. In order to detect rough roads, white gaussian noise has been assumed as the dominant behavior correlated to rough road or gravel roads. However, torque signals of a torsion bar of the vehicle steering may exhibit a scale scattered variation which cannot be detected with band pass methods. Some example embodiments described herein include a poly-scale method of noise detection in the form of fractal dimensions. This approach to rough road condition detection may improve several vehicle functions, such as adaptive lateral controls, adaptive cruise control (ACC), an advanced driver-assistance system (ADAS), etc.

For example, poly-scale quantification of non-white non-gaussian behavioral implications in non-stationary wide-band signals may facilitate detection of rough road conditions based on feedback noise in torque signals of a torsion bar of the vehicle steering linkage, which can be used to automatically reduce acceleration of the vehicle, automatically apply brakes of the vehicle, automatically control a steering orientation of the vehicle, etc., to mitigate the detected rough road conditions by slowing down the vehicle, steering the vehicle to a portion of the road with better conditions, etc.

Some example embodiments include a frequency independent framework for non-white non-gaussian anomaly detection, of non-stationary wideband signals with bounded temporal accuracy. Fractal dimensional analysis of induced dynamics' characteristics with minimal tuning parameters may improve detection and mitigation of rough road conditions based on torque sensor signals which include road condition feedback noise through the vehicle steering linkage.

Road behavior qualification may be determined according to an induced component of poly-scale behavior in a torsion bar signal. An index assignment and speed adjustment due to roughness of a road may be automatically applied (e.g., by an ADAS), based on calculating fractal dimensions of a torsion bar signal.

Figure 1:
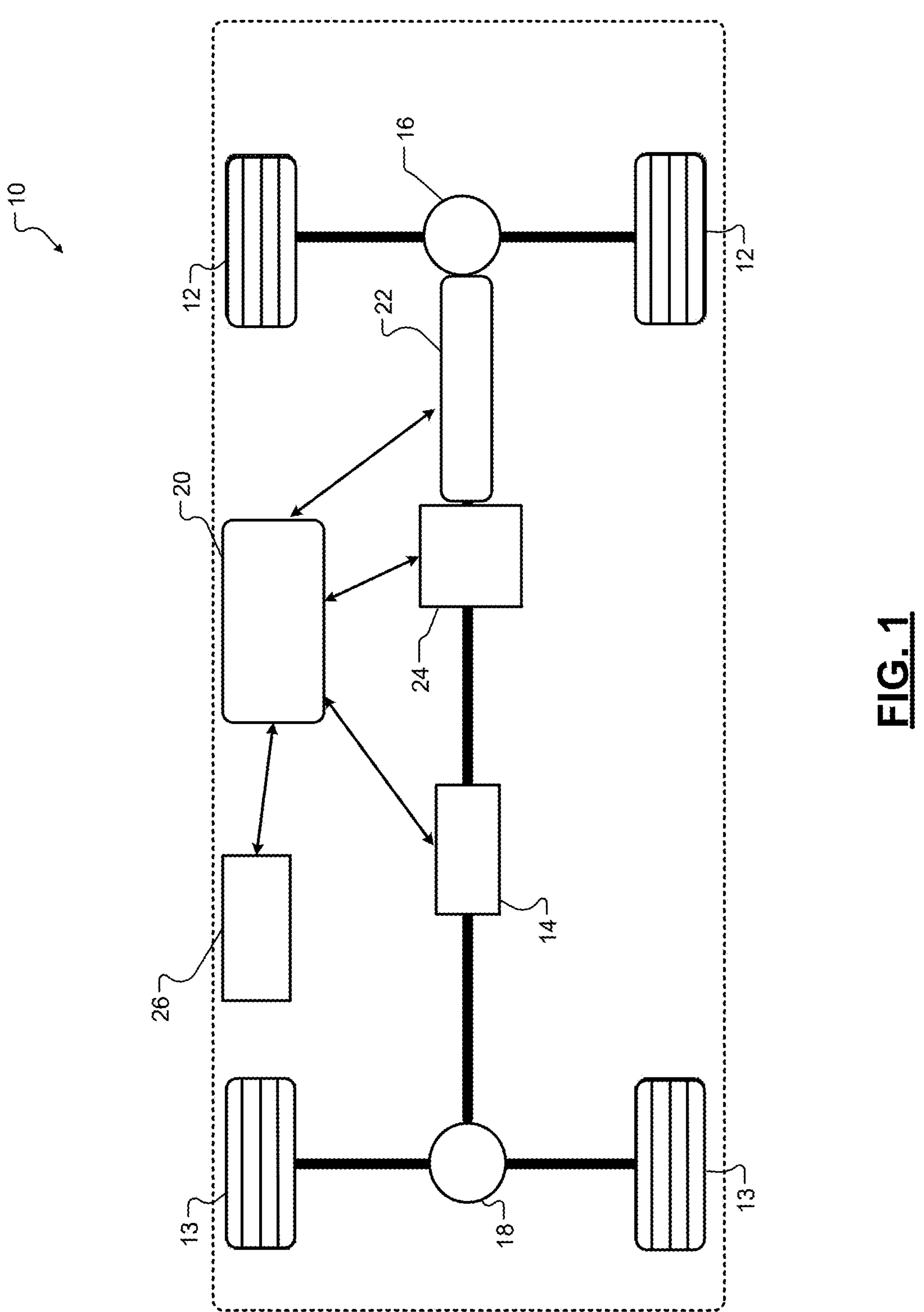
FIG. 1 is a diagram of an example vehicle including a vehicle control module configured to detect rough road conditions based on a torque signal from a torque sensor.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration pedal, a brake pedal, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as steering linkage torque sensors, cameras, microphones, pressure sensors, steering wheel position sensors, braking sensors, location sensors such as global positioning system (GPS) antennas, wheel height and/or position sensors, accelerometers, etc.). Some sensors may be configured to monitor current motion of the vehicle, acceleration of the vehicle, braking of the vehicle, current steering direction of the vehicle, current net torque applied to a steering linkage (e.g., a torsion bar) of the vehicle, etc.

In some examples, the vehicle one or more optional cameras. Each camera may include any suitable camera hardware components, image processing capabilities, etc., to capture images of surroundings of the vehicle, such as road features, other vehicles, etc. In some examples, images from vehicle cameras may be used for object detection, automated driving, lane determination, etc. Other systems such as Lidar may be used to determine images or information about the surrounding environment of the vehicle.

The vehicle 10 includes a steering linkage 22, which is configured to control a steering orientation of the front wheels 12 based on driver input, such as rotating a steering wheel of the steering linkage 22. As described further below with reference to FIG. 2, the steering linkage 22 may include any suitable components, such as a steering wheel, a torsion bar, a steering column, a rack and pinion with one or more gears or teeth, one or more steering arms, one or more steering knuckles, etc.

A torque sensor 24 is coupled with the steering linkage 22, and is configured to detect a net torque applied to the steering linkage 22. For example, the torque sensor 24 may be coupled with a torsion bar of the steering linkage 22, underneath a steering wheel. The torque sensor 24 may include one or more magnets and magnetoresistive elements configured to detect rotation of the torsion bar, and output a torque signal. The torque signal may represent steering input applied by the driver by rotating the steering wheel, feedback noise through the steering linkage 22 based on contact between the front wheels 12 and the road (which may be processed to determine a presence of rough road conditions as described herein), etc.

The vehicle control module 20 may communicate with another device via a wireless communication interface 28, which may include one or more wireless antennas for transmitting and/or receiving wireless communication signals. For example, the wireless communication interface 28 may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface 28 may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

Figure 2:
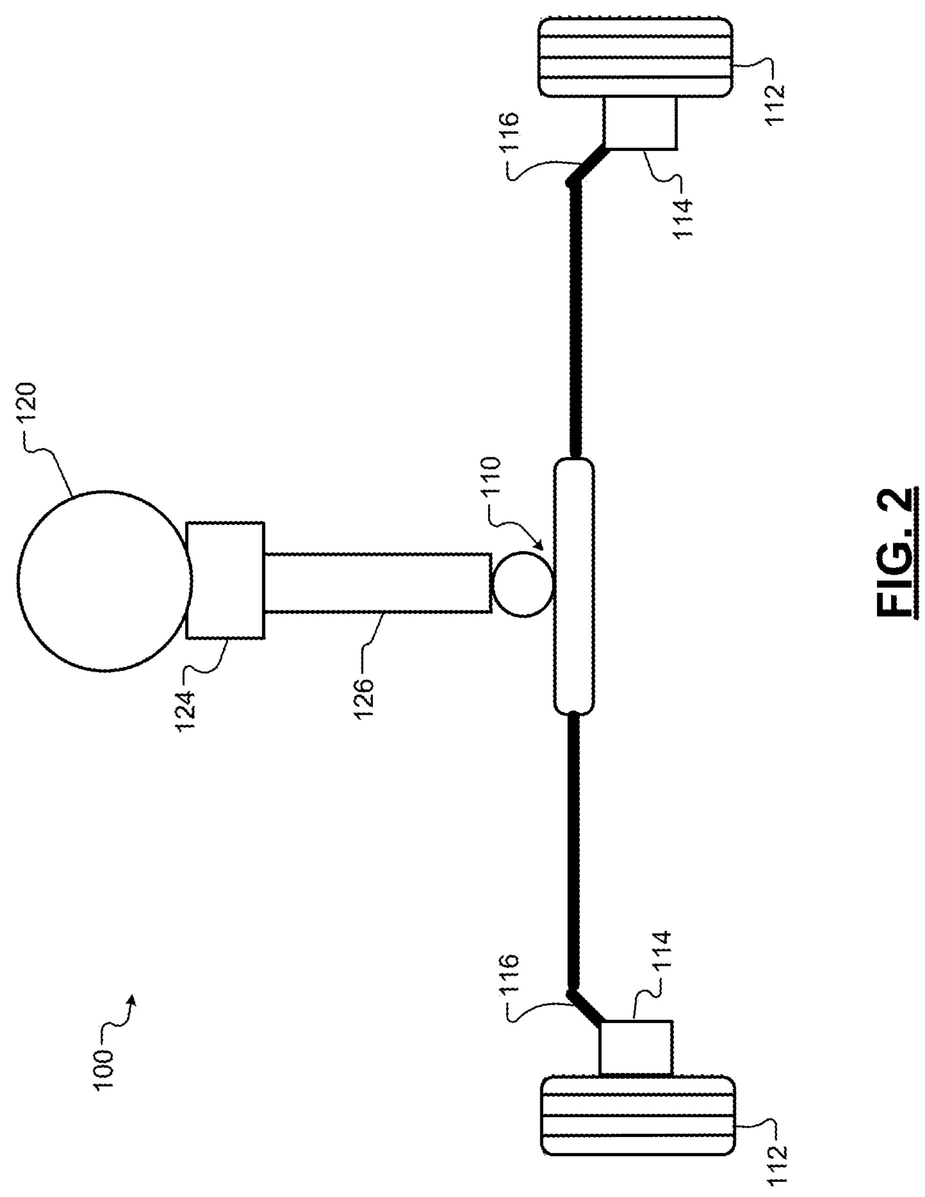
FIG. 2 is a block diagram of an example steering linkage of the vehicle of FIG. 1, including a torque sensor.

FIG. 2 is a block diagram of an example steering linkage 100 of a vehicle (such as the steering linkage 22 of FIG. 1), including a torque sensor 124. As shown in FIG. 2, the torque sensor is coupled with a torsion bar 126, which may be a steering column. The torsion bar 126 is coupled with a steering wheel 120, and the torque sensor 124 may be located underneath the steering wheel 120.

At an end of the torsion bar 126 opposite the steering wheel 120, the torsion bar 126 is coupled with a rack and pinion 110. The rack and pinion 110 may include one or more gears and teeth, which move steering arms 116 in response to rotation of the torsion bar 126.

Each steering arm 116 is coupled with a steering knuckle 114, which is coupled with one of the wheels 112. Rotation of the steering wheel 120 may control a steering orientation of wheels 112, such as via mechanical movement and/or rotation of the torsion bar 126, the rack and pinion 110, the steering arms 116 and the steering knuckles 114. Although FIG. 2 illustrates one example arrangement of the steering linkage 100, other example embodiments may include other suitable steering linkage arrangements.

The torque sensor 124 is configured to detect a net torque applied to the steering linkage 100, such as a net torque applied to the torsion bar 126. The net torque signal may include rotational steering input applied to the steering wheel 120 by a driver, road feedback noise received through the wheels 112, the steering knuckles 114, the steering arms 116, the rack and pinion 110 and the torsion bar 126, etc.

In some example embodiments, the torque sensor sits on a steering pinion. A pole wheel may be fitted on an input shaft, which is connected to the steering pinion by the torsion bar. When the driver applies torque to the steering wheel, the torsion bar is rotated and, in turn, a magnet is relative to the torque sensor. The torque sensor may include magnetoresistive elements whose resistance changes as the field direction changes. The torque sensor may have a measuring range covering +/−10 Nm (or more or less).

In some example embodiments, a method for anomaly detection by decomposition of non-stationary wideband discrete signals in dyadic scales includes calculating the expected length measure at each vel size (scale), which covers the full time series at that scale. These details may include measures of non-white non-gaussian phenomena, and a consistent sampling frequency may be the only assumptions about the signal.

In some examples, a method for anomaly detection by decomposition of non-stationary wideband discrete signals in dyadic scales and calculating the expected Variance measure at each vel size (scale), which covers the full time series at that scale. These details may include measures of non-white non-gaussian phenomena, and a consistent sampling frequency may be the only assumptions about the signal.

Some example embodiments may generate a poly-scale measure of the fractal dimension in terms of variance and length fractal dimensions, from the above-described multi-scale measures, by calculating the slope of the log-log behavior of the length and variance measures with respect to each scale, and performing a normalized Har exponent operation. Example embodiments may minimize calibration parameters' dependability by introducing expected value utilization of length and variance measures at multiscale and at poly-scale.

In some examples, application of the above steps to the torsion bar torque signal may include dynamic related driver input, process noise, and road induced behavior for qualification of road roughness, based on the values of the fractal dimensions (e.g., poly-scale measures) of the torsion bar signal. Example embodiments may provide index assignment and speed adjustment to roughness of a road based on variance and length fractal dimensions of the torsion bar signal.

Figure 3:
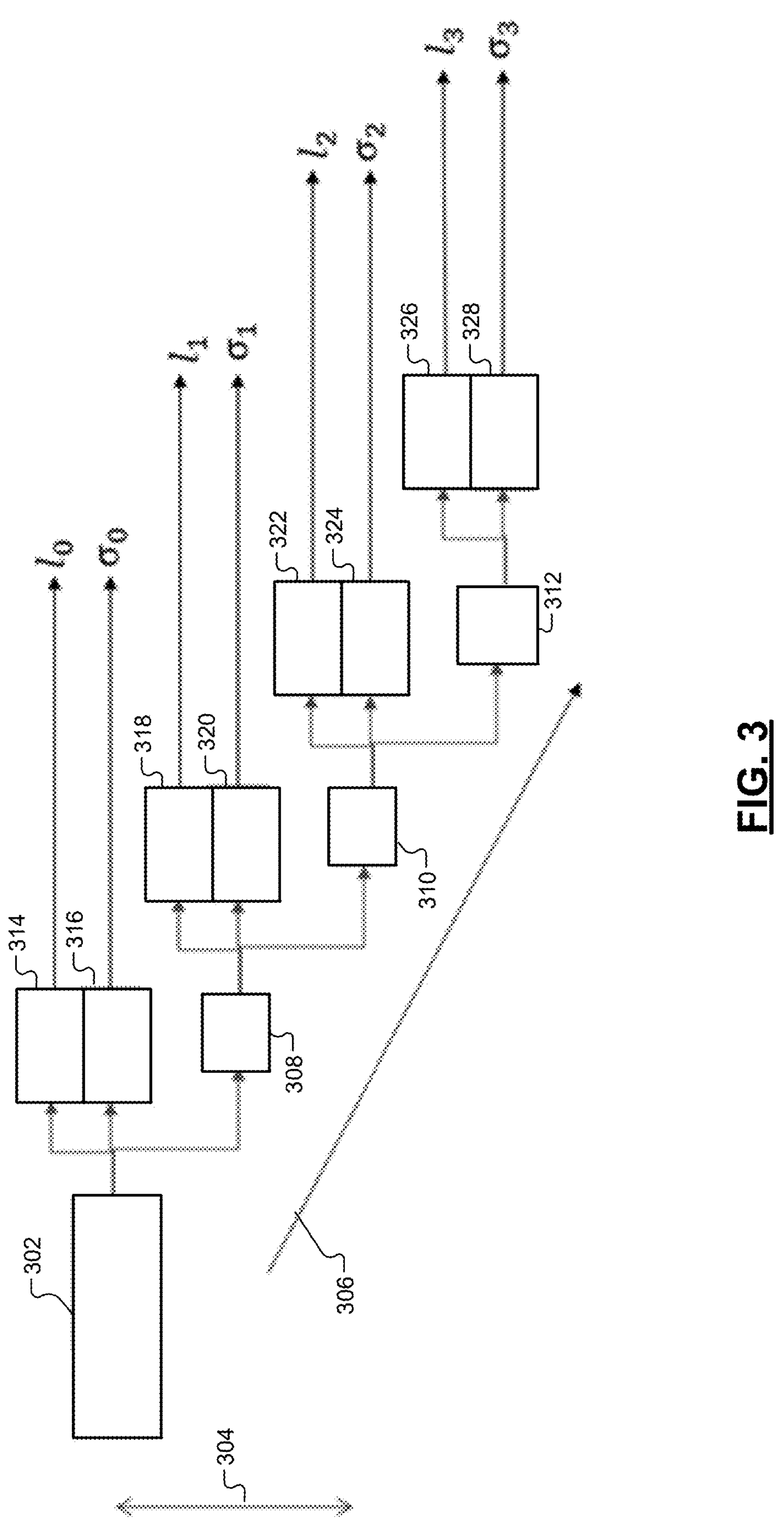
FIG. 3 is a diagram illustrating different sampling periods for determining average length fractal dimensions and variance fractal dimensions for a torque signal.

FIG. 3 is a diagram illustrating different sampling periods for determining average length fractal dimensions and variance fractal dimensions for a torque signal. As shown in FIG. 3, a torque signal 302 from the torque sensor of the steering linkage is processed at various sampling frequencies. The scale 304 changes across sampling frequencies, where lower frequencies correspond to a bigger scale and higher frequencies correspond to a smaller scale.

As shown in FIG. 3, the sampling frequencies 306 may follow a dyadic scale, where the first sampling frequency is m=1 (e.g., every sample value), the second sampling frequency is m=2 (e.g., every other sample value), m=4 (e.g., every fourth sample), m=8 (e.g., every eight sample), and so on.

At a first sampling frequency, a first average length value 314 is determined, and a first average variance value 316 is determined. The first average length value 314 may be determined by averaging a length fractal dimension value of the torque signal 302 for each sample at the first sampling frequency. The first average variance value 316 may be determined by averaging a variance fractal dimension value of the torque signal 302 for each sample at the first sampling frequency.

The second sampling frequency 308 may be half of the first sampling frequency (e.g., by doubling the period between samples in a dyadic scale). At the second sampling frequency 308, a second average length value 318 is determined, and a second average variance value 320 is determined. The second average length value 318 may be determined by averaging a length fractal dimension value of the torque signal 302 for each sample at the second sampling frequency. The second average variance value 320 may be determined by averaging a variance fractal dimension value of the torque signal 302 for each sample at the second sampling frequency.

The third sampling frequency 310 may be half of the second sampling frequency (e.g., by doubling the period between samples again in the dyadic scale). At the third sampling frequency 310, a third average length value 322 is determined, and a third average variance value 324 is determined. The third average length value 322 may be determined by averaging a length fractal dimension value of the torque signal 302 for each sample at the third sampling frequency. The third average variance value 324 may be determined by averaging a variance fractal dimension value of the torque signal 302 for each sample at the third sampling frequency.

The fourth sampling frequency 312 may be half of the third sampling frequency (e.g., by doubling the period between samples again in the dyadic scale). At the fourth sampling frequency 312, a fourth average length value 326 is determined, and a fourth average variance value 328 is determined. The fourth average length value 326 may be determined by averaging a length fractal dimension value of the torque signal 302 for each sample at the fourth sampling frequency. The fourth average variance value 328 may be determined by averaging a variance fractal dimension value of the torque signal 302 for each sample at the fourth sampling frequency. This may be repeated for as many sampling frequencies are desired or specified in the system.

Figure 4:
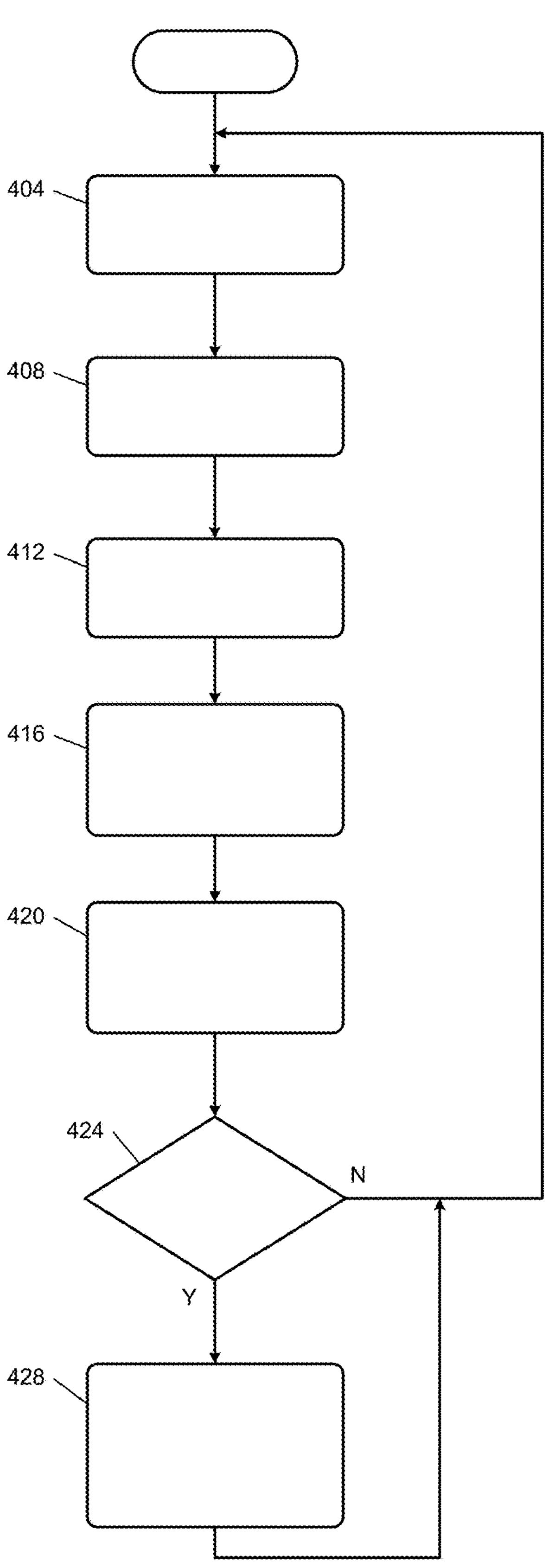
FIG. 4 is a flowchart depicting an example process for detecting and mitigating rough road conditions based on a torque signal from a torque sensor.

FIG. 4 is a flowchart depicting an example process for detecting and mitigating rough road conditions based on a torque signal from a torque sensor. In some examples, the process of FIG. 4 may be implemented by the vehicle control module 20 of FIG. 1. The process begins at 404, by obtaining an array of torque signals from a torque sensor, such as the torque sensor 24 in FIG. 1.

At 408, the vehicle control module is configured to decompose the torque signals, such as by decomposing non-stationary wideband discrete signals in dyadic scales. At 412, control extracts length fractal dimension values at different frequencies, such as by calculating expected length measures at each vel size (e.g., scale), which covers a full time series of the torque signal at that scale.

At 416, control extracts variance fractal dimension values at different frequencies, such as by calculating expected variance measures at each vel size (e.g., scale), which covers a full time series of the torque signal at that scale. Control then compares average length and/or variance values to one or more thresholds which are indicative or rough road conditions, at 420. For example, average length and/or variance values may be plotted on a log scale with respect to corresponding sampling frequencies, where a slope of the plot is compared to a threshold to determine whether a rough road condition exists. In various implementations, both the length and variance values may be compared to thresholds, the threshold determination may be based on only the length values, or the threshold determination may be based only on the variance values.

In some examples, the slope may be determined according to a Har exponent of a variance fractal dimension. Example equations based on a log scale plot of the variance values (o) and the sampling values (m) may include:

$$\log(\sigma) = 2H\log(m) + c$$

$$\sigma_{FD} = 2 - H$$

The Har exponent of the variance fractal dimension may be defined as:

$$H = \frac{1}{2}\lim_{\Delta t \to 0} \frac{\log[\mathrm{Var}[\Delta y]]}{\log[\Delta t]}$$

Where $D_\sigma$=E+1−H, and E is 1 for a time series. Therefore, a varying vel size of dyadic order, at scale k, may be represented as:

$$V_{k,m} = \frac{1}{J_k - 1} \left[ \sum_{j=1}^{J_k} (y[m + jn_k] - y[m + (j-1)n_k])^2 - \frac{1}{J_k}(y[m + jn_k] - y[m + (j-1)n_k])^2 \right]$$

Where j sweeps the frame, m is the vel counter, and the second term is the average of the differences. With $V_k$ determined, for each scale $n_k$, the Har exponent can be drawn from the log-log relationship. Similarly, example equations based on a log scale plot of the length values (l) and the sampling values (m) may include:

$$\log(l) = 2H\log(m) + c$$

$$l_{FD} = 2 - H$$

At 424, the vehicle control module is configured to determine whether the values exceed the one more thresholds indicative of rough road conditions. As an example, a slope of log scale average length values which is greater than 1.7 may be indicative of the presence of rough road conditions, and a slope of log scale average length values which is greater than 1.4 may be indicative of the presence of rough road conditions. These values are presented as one example, and other example embodiments may use other threshold values, other types of thresholds or threshold criteria, more or less threshold parameters, etc.

If the values exceed the threshold at 424, control proceeds to 428 to automatically modify automated acceleration, breaking and/or steering of the vehicle to mitigate rough road conditions. For example, the vehicle control module may be configured to automatically slow down acceleration or an electric motor, automatically apply brakes to the wheels to slow the vehicle, and/or automatically modify steering to avoid a rough portion of the road, in response to detection of the rough road condition. Control then returns to 404 to obtain a next array of torque signals from the torque sensor over a next time period.

Figure 5:
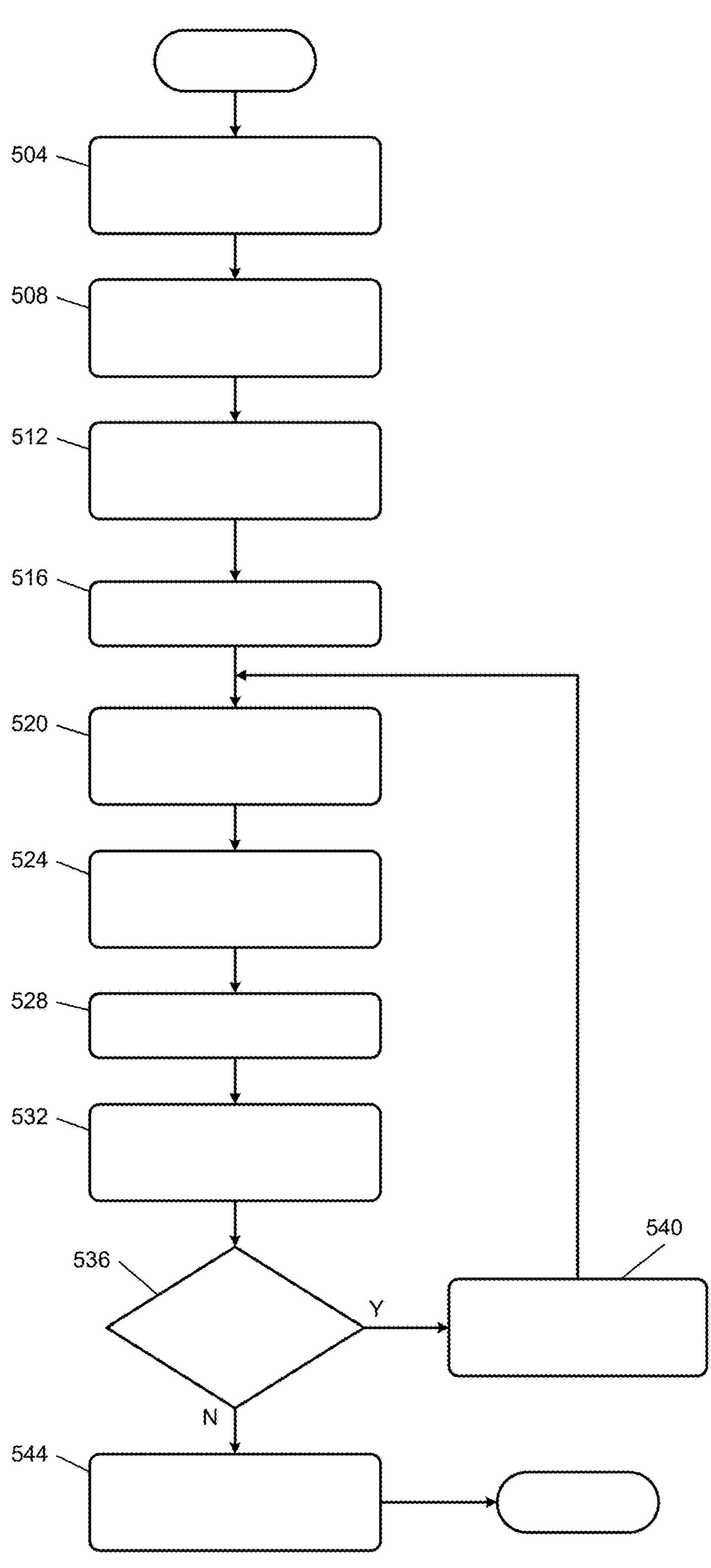
FIG. 5 is a flowchart depicting an example process for determining average length fractal dimensions and variance fractal dimensions at different sampling frequencies.

FIG. 5 is a flowchart depicting an example process for determining average length fractal dimensions and variance fractal dimensions at different sampling frequencies. In some examples, the process of FIG. 5 may be implemented by the vehicle control module 20 of FIG. 1. The process begins at 504, by obtaining an array of torque signals from the torque sensor.

At 508, the vehicle control module is configured to divide the torque signal into multiple time windows. Control then feeds the torque signal to a processor (e.g., of the vehicle control module 20) at repeating discrete time periods, at 512, which may correspond to the multiple time windows.

At 516, control selects a first sample frequency. For example, various sampling frequencies may be used to determine length fractal dimension values and variance fractal dimension values of the torque signal, which may be multiples of one another. In some examples, the sampling frequencies may be every 1 nanosecond, every ten nanoseconds, ever 100 nanoseconds, every 1 microsecond, every 10 microseconds, every 100 microseconds, every second, etc., and any values within (or beyond) those example sampling frequencies.

At 520, the vehicle control module is configured to calculate length values for each sample, at the selected frequency. The length values may be calculated as length fractal dimension values of the torque signal at each step of the selected sampling frequency.

The vehicle control module is configured to calculate variance values for each sample at the selected sampling frequency, at 524. For example, the variance values may be calculated as variance fractal dimension values of the torque signal at each step of the selected sampling frequency.

At 528, control determines average length and variance values for the selected sampling frequency. Control then stores the average length and variance values for each selected sampling frequency, at 532. At 536, control determines whether any sample frequencies remain.

If so, control proceeds to 540 to select a next sampling frequency by doubling the current sample period (e.g., so that the next sampling frequency is half of the current sampling frequency). Control then returns to 520 to calculate length values for each sample at the next sampling frequency.

Once all sample frequencies have been processed at 536, control proceeds to 544 to process the average length and variance values, such as by plotting the average values on a log scale and comparing a slope of the plots to threshold values indicative of rough road conditions. Further details regarding processing of the average length and variance values are discussed further below with reference to FIG. 6.

Figure 6:
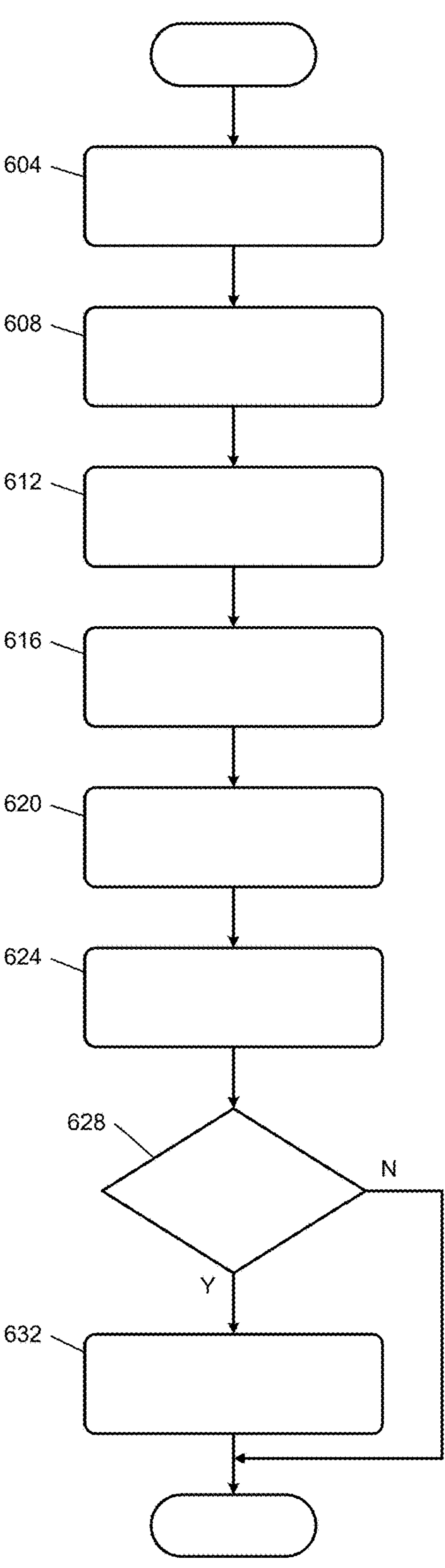
FIG. 6 is a flowchart depicting an example process for comparing log plot slope values of average length fractal dimensions and variance fractal dimensions, to determine whether a rough road condition exits.

FIG. 6 is a flowchart depicting an example process for comparing log plot slope values of average length fractal dimensions and variance fractal dimensions, to determine whether a rough road condition exits. In some examples, the process of FIG. 6 may be implemented by the vehicle control module 20 of FIG. 1.

The process begins at 604, by obtaining average length and variance values for each sampling frequency. Control then plots average length values on a log scale with respect to sampling frequency at 608 (e.g., a log scale of the sampling frequencies on the x-axis and a log scale of length values on the y-axis). At 612, the vehicle control module is configured to determine a slope of the length values log plot.

At 616, the vehicle control module is configured to plot the average variance values on a log scale for each sampling frequency (e.g., a log scale of the sampling frequencies on the x-axis and a log scale of variance values on the y-axis). At 620, the vehicle control module is configured to determine a slope of the variance values log plot.

At 624, the vehicle control module is configured to compare slope values for the average length and/or variance values to one or more thresholds indicative of rough road conditions. At 628, control determines whether the slope values exceed the one or more thresholds. If so, control generates an advanced driver-assistance system (ADAS) signal indicative of the rough road conditions at 632. The signal may be used to control automated acceleration, braking and/or steering of the vehicle, to mitigate the detected rough road conditions (e.g., by slowing down the vehicle or steering to a different portion of the road where the conditions are not as rough).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for automated mitigation of rough road conditions, the vehicle system comprising:

front wheels of a vehicle;

a steering linkage coupled with the front wheels and configured to control a steering orientation of the front wheels;

a torque sensor coupled with the steering linkage and configured to generate a torque signal associated with the steering linkage; and a vehicle control module configured to:

obtain the torque signal from the torque sensor;

calculate a first average length value for the torque signal according to a first sampling frequency;

calculate a first average variance value for the torque signal according to the first sampling frequency;

calculate a second average length value for the torque signal according to a second sampling frequency, wherein the second sampling frequency is less than the first sampling frequency;

calculate a second average variance value for the torque signal according to the second sampling frequency;

determine whether a rough road condition threshold is satisfied according to the first average length value, the first average variance value, the second average length value and the second average variance value; and automatically adjust at least one of vehicle acceleration, vehicle braking or vehicle steering, in response to the rough road condition threshold being satisfied.

2. The vehicle system of claim 1, wherein the steering linkage includes:

a steering wheel;

a steering column coupled with the steering wheel;

a rack and pinion coupled with the steering column;

two steering arms coupled with the rack and pinion; and two steering knuckles each coupled between one of the two steering arms and one of the front wheels, wherein the steering wheel is configured to change the steering orientation of the front wheels in response to a receiving a rotation input from a driver, via mechanical movement or rotation of the steering column, the rack and pinion, the two steering arms and the two steering knuckles.

3. The vehicle system of claim 1, wherein:

the steering linkage includes a torsion bar and a steering wheel; and the torque sensor is positioned at a top of the torsion bar, underneath the steering wheel.

4. The vehicle system of claim 3, wherein:

the torque sensor is configured to measure net torque applied to the torsion bar, which includes rotation input applied to the steering wheel by a driver, and feedback noise due to mechanical interaction of the front wheels with a road the vehicle is traveling on.

5. The vehicle system of claim 4, wherein the torque sensor includes a magnet and magnetoresistive elements which change resistance in response to the magnet being rotated relative to the magnetoresistive elements due to rotation of the torsion bar.

6. The vehicle system of claim 1, wherein the vehicle control module is configured to:

calculate a third average length value for the torque signal according to a third sampling frequency, wherein the third sampling frequency is less than the first sampling frequency and the second sampling frequency;

calculate a third average variance value for the torque signal according to the third sampling frequency; and determine whether the rough road condition threshold is satisfied according to the first average length value, the first average variance value, the second average length value, the second average variance value, the third average length value and the third average variance value.

7. The vehicle system of claim 6, wherein:

the second sampling frequency is half of the first sampling frequency; and the third sampling frequency is half of the second sampling frequency.

8. The vehicle system of claim 1, wherein calculating the first average length value includes:

calculating a length fractal dimension value for each sample of the torque signal according to the first sampling frequency; and determining an average of calculated length fractal dimension values for each sample.

9. The vehicle system of claim 1, wherein calculating the first average variance value includes:

calculating a variance fractal dimension value for each sample of the torque signal according to the first sampling frequency; and determining an average of calculated variance fractal dimension values for each sample.

10. The vehicle system of claim 1, wherein the vehicle control module is configured to:

generate a length plot each average length value with respect to each corresponding sampling frequency on a log scale;

determine a length slope value according to the length plot of each average length value;

generate a variance plot each average variance value with respect to each corresponding sampling frequency on the log scale;

determine a variance slope value according to the variance plot of each average variance value; and determine whether the rough road condition threshold is satisfied by comparing the length slope value and the variance slope value to slope value thresholds.

11. The vehicle system of claim 1, wherein:

a length slope value threshold is at least 1.7; and a variance slope value threshold is at least 1.4.

12. A method for automated mitigation of rough road conditions, the method:

obtaining a torque signal from a torque sensor coupled with a steering linkage of a vehicle, wherein the vehicle includes front wheels, the steering linkage is coupled with the front wheels of the vehicle, and the steering linkage is configured to control a steering orientation of the front wheels;

calculating a first average length value for the torque signal according to length fractal dimensions of the torque signal at a first sampling frequency;

calculating a second average length value for the torque signal according to length fractal dimensions of the torque signal at a second sampling frequency, wherein the second sampling frequency is less than the first sampling frequency;

determining whether a rough road condition threshold is satisfied according to the first average length value, and the second average length value; and automatically adjusting at least one of vehicle acceleration, vehicle braking or vehicle steering, in response to the rough road condition threshold being satisfied.

13. The method of claim 12, further comprising:

calculating a third average length value for the torque signal according to length fractal dimensions of the torque signal at a third sampling frequency, wherein the third sampling frequency is less than the first sampling frequency and the second sampling frequency; and determining whether the rough road condition threshold is satisfied according to the first average length value, the second average length value, and the third average length value.

14. The method of claim 13, wherein:

the second sampling frequency is half of the first sampling frequency; and the third sampling frequency is half of the second sampling frequency.

15. The method of claim 12, further comprising:

plotting each average length value with respect to each corresponding sampling frequency on a log scale;

determining a length slope value according to the plot of each average length value; and determining whether the rough road condition threshold is satisfied by comparing the length slope value to a slope value threshold.

16. The method of claim 12, wherein:

the steering linkage includes a torsion bar and a steering wheel; and the torque sensor is configured to measure net torque applied to the torsion bar, which includes rotation input applied to the steering wheel by a driver, and feedback noise due to mechanical interaction of the front wheels with a road the vehicle is traveling on.

17. A method for automated mitigation of rough road conditions, the method:

obtaining a torque signal from a torque sensor coupled with a steering linkage of a vehicle, wherein the vehicle includes front wheels, the steering linkage is coupled with the front wheels of the vehicle, and the steering linkage is configured to control a steering orientation of the front wheels;

calculating a first average variance value for the torque signal according to variance fractal dimensions of the torque signal at a first sampling frequency;

calculating a second average variance value for the torque signal according to variance fractal dimensions of the torque signal at a second sampling frequency, wherein the second sampling frequency is less than the first sampling frequency;

determining whether a rough road condition threshold is satisfied according to the first average variance value, and the second average variance value; and automatically adjusting at least one of vehicle acceleration, vehicle braking or vehicle steering, in response to the rough road condition threshold being satisfied.

18. The method of claim 17, further comprising:

calculating a third average variance value for the torque signal according to variance fractal dimensions of the torque signal at a third sampling frequency, wherein the third sampling frequency is less than the first sampling frequency and the second sampling frequency; and determining whether the rough road condition threshold is satisfied according to the first average variance value, the second average variance value, and the third average variance value.

19. The method of claim 18, wherein:

the second sampling frequency is half of the first sampling frequency; and the third sampling frequency is half of the second sampling frequency.

20. The method of claim 17, further comprising:

plotting each average variance value with respect to each corresponding sampling frequency on a log scale;

determining a variance slope value according to the plot of each average variance value; and determining whether the rough road condition threshold is satisfied by comparing the variance slope value to a slope value threshold.

* * * * *